United States Patent
Choiniere et al.

(10) Patent No.: US 10,077,972 B1
(45) Date of Patent: Sep. 18, 2018

(54) SAL SEEKER WITH SPATIAL AND TEMPORAL SENSORS

(71) Applicant: BAE SYSTEMS Information and Electronic Systems Integration Inc., Nashua, NH (US)

(72) Inventors: Michael J. Choiniere, Merrimack, NH (US); Robert D. Frey, Jr., Bolton, MA (US); Eric C. Moore, Greenfield, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 15/646,659

(22) Filed: Jul. 11, 2017

(51) Int. Cl.
*F41G 7/22* (2006.01)

(52) U.S. Cl.
CPC .................... *F41G 7/226* (2013.01)

(58) Field of Classification Search
CPC ........................................ F41G 7/226

USPC ........................ 250/338.4; 244/3.16, 3.17
See application file for complete search history.

(56) References Cited

U.S. PATENT DOCUMENTS

| | | | | |
|---|---|---|---|---|
| 2014/0320843 | A1* | 10/2014 | Streuber | F41G 7/008 356/4.01 |
| 2014/0374533 | A1* | 12/2014 | Ell | F41G 7/226 244/3.15 |
| 2017/0370677 | A1* | 12/2017 | Rutkiewicz | F41G 7/26 |

* cited by examiner

*Primary Examiner* — Marcus Taningco
*Assistant Examiner* — Gisselle Gutierrez
(74) *Attorney, Agent, or Firm* — Davis & Bujold, PLLC

(57) ABSTRACT

A system and method for a semi-active laser seeker combining a temporal and a spatial sensor to form a seeker with a wide angle FOV and low angle error for use with spinning projectiles with spin rates of up to 300 Hz. The FOV is about 40 degrees and the angle error is less than 0.1 degrees. The seeker utilizes a CCA and fits into a small, low cost package, of about 1.5 in³ or less.

20 Claims, 1 Drawing Sheet

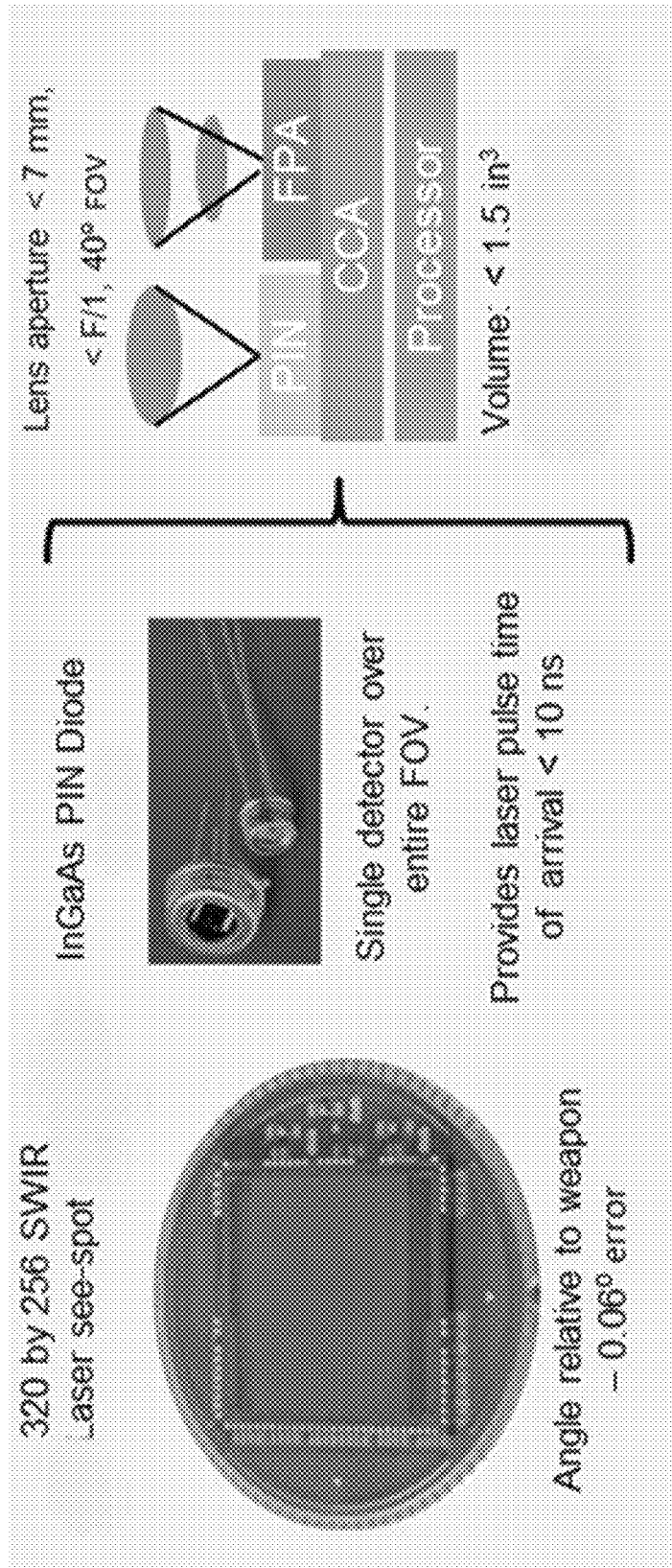

SAL SEEKER WITH SPATIAL AND TEMPORAL SENSORS

FIELD OF THE DISCLOSURE

The present disclosure relates to guidance systems and more particularly to semi-active laser guidance systems for use with spinning projectiles.

BACKGROUND OF THE DISCLOSURE

Currently, image seekers must de-roll the seeker to fly level relative to the target. This is very costly and tends to eliminate image seekers from use with spinning weapon systems; mortars, artillery shells, etc. With the approach of the present disclosure, a low cost seeker can be realized for use with spinning weapon systems.

SUMMARY OF THE DISCLOSURE

One aspect of the present disclosure is a semi-active laser seeker for use with spinning projectiles comprising a spatial sensor for collecting image data and having a spatial resolution of about 320×256 pixels; and a temporal sensor configured to detect laser time of arrival in the nanosecond range, wherein the spatial sensor and the temporal sensor together have a 40 degree FOV, and an angle error of less than 0.1 degrees for spin rates up to about 300 Hz.

One embodiment of the semi-active laser seeker is wherein the spatial sensor is a SWIR see-spot camera. In certain embodiments, the temporal sensor is a PIN diode. In some cases, the semi-active laser seeker further comprises an in-line processor configured to strip the image data such that only a single-bit laser flag is processed per pixel. The in-line processor may be a CCA.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

FIG. 1 shows one embodiment of the semi-active laser seeker of the present disclosure for use with spinning projectiles.

DETAILED DESCRIPTION OF THE DISCLOSURE

Laser guidance systems are used by military to guide a missile or other projectile to a target by means of a laser beam, e.g. semi-active radar, or semi-active laser (SAL) homing. With this technique, a laser is kept pointed at a target and the laser radiation bounces off the target and is scattered in all directions. The projectile is launched somewhere near the target and when it is close enough for some of the reflected laser energy from the target to reach it, a laser seeker detects which direction this energy is coming from and adjusts the projectile trajectory towards the source.

Using an imager seeker provides great spatial resolution but lacks any temporal data to determine the attitude of the weapon system to the exact time when the laser pulse is received. Image seekers are also limited to the frame rate of the camera. This ambiguity results in increased target location angle error due to the weapon body motion within the frame time being added to the seeker spatial error. This error is amplified in a spinning weapon (mortar/artillery) where within one frame time (0.010 to 0.030 seconds) the weapon can transverse 360 degrees. In addition, the lack of temporal data prevents (pulse interval module) PIM decoding and counter countermeasure capability.

One traditional approach is a quad-cell (2×2 pixels). While a quad-cell is inexpensive, it places the burden of its limited performance on other kill chain subsystems such as the designator requiring higher energy to improve signal-to-noise (SNR) to achieve lower angle noise. Poor angle performance information limits guidance before endgame, thus requiring more control at endgame as well. Additionally, quad-cells have limited effective weapons range; especially in adverse weather conditions as they are signal-starved systems due to high SNR requirements. While some quad-cell-based systems improve angle reconstruction by coupling the quad-cell with a gimbal, thus effectively reducing the tracking FOV, it is an impractical and costly solution.

It is understood that angle error is directly proportional to the FOV/SNR. By inserting a super quad-cell (10×10 multi-pixel array), SNR performance can be improved by the number of linear elements forming local domain quad cells. In one example, a 10×10 array decreased the SNR requirement by 9× and retained the attributes of the quad-cell, but drove the cost and volume requirements for the system up too high to be practical. Additionally, the back-end electronics required processing the 100 distinct channels at >30 MHz (defined by the designator pulse) while measuring amplitude to within <3% to achieve a 0.15° error.

The present solution adds a second, small, low cost temporal detector that covers the entire seeker FOV to determine time of arrival of each pulse to a spatial detector such as a see-spot detector array. When the laser pulse is received, the seeker of the present disclosure time stamps the event, and matches it to the inertial measurement unit (IMU) current attitude data. The IMU data combined with the pulse time of arrival and the pixel coordinate information in the seeker of the present disclosure represents target position and allows for the complete navigation of a spinning weapon.

It is understood that measuring amplitude drives up seeker cost. A larger array can eliminate that with pulse detection embedded in the pixel utilizing analog threshold. In certain embodiments of the present system, a see-spot camera is used (e.g., InGaAs 320×256 pixels). The SWIR camera technology embeds the laser pulse detection at the pixel level. The detected laser pulse sets a flag and attaches it to the pixel's scene data indicating a laser detection occurred during the 8 millisecond frame interval (for 120 Hz frame rate). The array size defines the angle error, and only requires simple PIN detection (SNR 7 dB) to achieve improved angle accuracy. In certain embodiments of the seeker of the present disclosure, the seeker has a 40° FOV and can achieve an angle error of 0.06°.

Any smearing effect is nullified since the IMU/weapon body attitude in known when the laser pulse is received. The pulse received corresponds to a pixel location in the seeker array. With the addition of temporal data, PIM codes can be decoded and correlated to the seeker pixel location data. In addition, a higher level of counter countermeasures can be employed.

In addition to marking/tagging with lasers, primarily for military, the system can be used for search-and-rescue, police SWAT, etc. The system of the present disclosure uses a seeker architecture that combines two sensors. The first, a spatial sensor, detects the designator pulse at the pixel level within about a 30 to 120 Hz frame rate. In some cases, a see-spot sensor is used. This sensor provides extreme angular position (0.06 degrees for a 320 array over 40 degrees FOV), but extremely poor temporal resolution, about 8 milliseconds. A spinning projectile at 300 Hz will rap 2.4 times around in 0.008 seconds. Therefore, a second sensor is needed. Here, a wide FOV temporal sensor is used to capture accurate laser pulse time of arrival at a 10 nanosecond resolution, if needed. Thus, the system provides 0.1 degree accuracy at 300 Hz rotation rate in 22 µseconds.

The output of the system of the present disclosure using both a spatial and a temporal sensor provides both PRF (pulse repetition frequency) and PIM (pulse interval module) code tracking. The system provides full navigation on a spinning projectile in a compact and cost effective package. In some cases, the system is contained within 1.5 in$^3$.

Referring to FIG. 1, one embodiment of the semi-active laser seeker of the present disclosure for use with spinning projectiles is shown. More specifically, a SWIR camera is paired with a PIN diode to create a semi-active laser seeker having a 40° FOV with a lens aperture of 7 mm in a 1.5 in$^3$ package. In some cases, the SWIR camera is 320×256 pixels with an angle error of 0.06°. The PIN diode is InGaAs providing laser pulse time of arrival of less than 10 ns. A single detector is useful for the entire FOV.

The system comprised of a Focal Plane Array (FPA) captures laser pulses event at the pixel level. Each pixel couples laser pulse energy into a detection circuit that generates a flag when the energy level crosses a threshold. The sensor azimuth and elevation accuracy is defined by the number of pixels within the FOV of the sensor. By combining this sensor with a wide FOV PIN sensor, temporal information (20 nanosecond resolution) can be obtained and correlated with the FPA/spatial sensor. Given most designators work at ~0.20 Hz, with the FPA sensor recoding at 120 Hz, multiple designators can de separated by both temporal and spatial filters. The decoding process provides the means for tracking multiple designators in the presence of a counter measure environment.

The processor function decodes the grouping of spatial and temporal pulse events using simple PRI tracking techniques. The 120 Hz sampling rate provides sufficient data when the designator does not exist (100 frames) and when it does (20 Hz). Coupling the spatial information (both designators don't mark the same target), sufficient information exists for the simple sorting of the pulse events with a small processor.

In the case of a spinning projectile, the IMU/Gyro can provide the impact of the spatial frame during the spin, thereby providing the additional information for the spatial tracking filters.

The addition of the time and spatial tracking filters provides a level of counter measure immunity since the counter measure doesn't typically occupy both the same temporal or spatial positions; allowing tracking filters for the counter measure device.

Another embodiment is a laser warning receiver. The same elements can be employed as an area defense to collect and characterize the laser event in azimuth and elevation from the spatial sensor and laser/weapon type from the laser signature captured by the temporal sensor.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. A semi-active laser seeker for use with spinning projectiles comprising:
    an inertial measurement unit configured to collect attitude data for a spinning projectile;
    a spatial sensor configured to collect image data and having a spatial resolution of about 320×256 pixels; and
    a temporal sensor configured to detect laser time of arrival in the nanosecond range for one or more laser pules,
    wherein the spatial sensor and the temporal sensor together have a 40 degree field of view, and an angle error of less than 0.1 degrees for spinning projectiles having spin rates up to about 300 Hz.

2. The semi-active laser seeker of claim 1, wherein the spatial sensor is a short wave infrared camera.

3. The semi-active laser seeker of claim 1, wherein the temporal sensor is a PIN diode.

4. The semi-active laser seeker of claim 1, further comprising an in-line processor configured to strip the image data such that only a single-bit laser flag is processed per pixel.

5. The semi-active laser seeker of claim 4, wherein the in-line processor is a circuit card assembly.

6. A method for tracking a target using a semi-active laser seeker on a spinning projectile comprising:
  receiving a laser pulse from a target via a spatial sensor wherein the spatial sensor has a frame rate of about 30 to 120 Hz;
  time stamping the receipt of the laser pulse in the nanosecond range via a temporal sensor; and
  matching the time stamped laser pulse to a current attitude data of the spinning projectile via an inertial measurement unit;
  wherein the spatial sensor and the temporal sensor together have an accuracy of less than 0.1 degrees.

7. The method for tracking a target using a semi-active laser seeker on a spinning projectile of claim 6, wherein the spatial sensor is a shortwave infrared camera.

8. The method for tracking a target using a semi-active laser seeker on a spinning projectile of claim 6, wherein the temporal sensor is a PIN diode.

9. The method for tracking a target using a semi-active laser seeker on a spinning projectile of claim 6, where the inertial measurement unit is a gyroscope.

10. The method for tracking a target using a semi-active laser seeker on a spinning projectile of claim 6, further comprising stripping the image data, via an in-line processor, such that only a single-bit laser flag is processed per pixel.

11. The method for tracking a target using a semi-active laser seeker on a spinning projectile of claim 6, further comprising sorting one or more groupings of spatial and temporal pulse events attributed to multiple designators using PRI tracking techniques.

12. The method for tracking a target using a semi-active laser seeker on a spinning projectile of claim 6, wherein the spatial sensor and the temporal sensor together have a 40 degree field of view.

13. The method for tracking a target using a semi-active laser seeker on a spinning projectile of claim 6, further comprising applying time and spatial tracking filters.

14. The semi-active laser seeker of claim 1, wherein the inertial measurement unit is a gyroscope.

15. The semi-active laser seeker of claim 1, wherein the temporal and spatial sensor provide both pulse repetition frequency and pulse interval module code tracking.

16. A semi-active laser seeker system for use with spinning projectiles comprising:
  an inertial measurement unit configured to collect attitude data for a spinning projectile;
  a spatial sensor configured to collect image data; and
  a temporal sensor configured to detect laser time of arrival in the nanosecond range for one or more laser pulses,
  wherein the spatial sensor and the temporal sensor operate asynchronously and together have a 40 degree field of view, and an angle error of less than 0.1 degrees for spinning projectiles.

17. The semi-active laser seeker of claim 16, wherein the system provides an azimuth and elevation information.

18. The semi-active laser seeker of claim 16, wherein the spatial sensor is a short wave infrared camera and the temporal sensor is a PIN diode.

19. The semi-active laser seeker of claim 16, further comprising an in-line processor configured to strip the image data such that only a single-bit laser flag is processed per pixel.

20. The semi-active laser seeker of claim 16, wherein the inertial measurement unit is a gyroscope.

\* \* \* \* \*